Patented Apr. 20, 1948

2,439,818

UNITED STATES PATENT OFFICE 2,439,818

SUBSTITUTED ESTERS OF BENZOIC ACID

Samuel M. McElvain, Madison, Wis., and Thomas P. Carney, Indianapolis, Ind.

No Drawing. Application April 27, 1946, Serial No. 665,644

5 Claims. (Cl. 260—293)

This is a continuation-in-part of our application Serial No. 602,657, filed June 30, 1945, and which became abandoned August 30, 1946.

This invention relates to anesthetic chemical compositions and is directed to novel substituted benzoic acid esters and salts thereof, and compositions containing such esters and their salts.

By this invention there are provided novel compounds represented by the following formula:

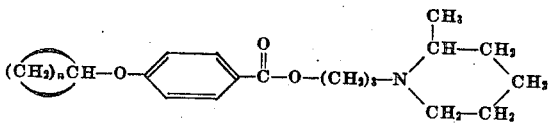

wherein $n$ is one of the integers 4 and 5; and their salts.

The compounds in accordance with the above formula are substituted benzoic acid esters and are stable, water-insoluble, viscous oils at room temperature. They are basic in character and form acid addition salts with acids.

Certain of the acid addition salts of the novel compounds represented above, such as the hydrochloride, hydrobromide, sulfate and phosphate, are white crystalline compounds which are readily water-soluble. Other acid addition salts, for example the picrate and the methylene-bis-hydroxynaphthoate are stable, crystalline compounds with relatively low water-solubility. Still other acid addition salts such as the oleate are soluble in oils.

Illustrative of the salts of the novel compounds represented above, the hydrochloric acid addition salt of 3-(2'-methylpiperidino)-propyl p-cyclohexyloxybenzoate may be represented by the following formula:

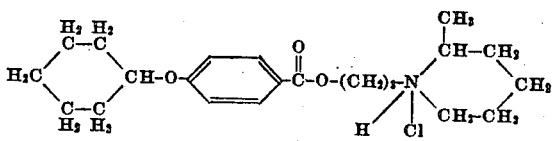

The new compounds of this invention may be prepared by esterification methods. Thus for example, 3-(2'-methylpiperidino)-propyl p-cyclohexyloxybenzoate may be prepared in the form of its hydrohalide salt by reacting, preferably in an inert solvent, a p-cyclohexyloxybenzoyl halide with 3 - (2' - methylpiperidino)-propyl alcohol. Additionally, it may be prepared as a hydrohalide salt by reacting p-cyclohexyloxybenzoic acid with a 3-(2'-methylpiperidino)-propyl halide in a solvent such as isopropanol. For use in the above methods, the halide of choice is the chloride and when such halide is used, 3-(2'-methylpiperidino)-propyl p-cyclohexyloxybenzoate is isolated as the hydrochloric acid salt. From the hydrochloride thus prepared the free ester may be prepared by treatment with alkali. 3-(2'-methylpiperidino-propyl p-cyclopentyloxybenzoate is prepared in a similar manner.

Acid addition salts of the compounds of this invention may be prepared by treating the ester with the appropriate acid. Furthermore, one salt may be converted to a different salt by treatment with the appropriate acid and preferential crystallization.

Compounds of the present invention have been found to be highly useful in therapeutics. Thus for example, 3-(2'-methylpiperidino)-propyl p-cyclohexyloxybenzoate is readily absorbed by mucous membranes producing an effective anesthesia of long duration. Furthermore, it is surprisingly well absorbed by scarified, abraded or burned skin and confers thereon a highly effective anesthesia of long duration, without irritation or toxic manifestations even when used over large areas, and the profundity of anesthesia is such as to permit necessary debridement without discomfort on the part of the patient.

Therapeutic compositions provided by this invention comprise the novel benzoic acid esters or salts thereof, in association with a suitable carrier or extending medium, or another therapeutic agent. By incorporation of the esters or salts thereof with such carrier or extending medium, the anesthetic properties of the novel compounds are utilized to the greatest advantage. The extending medium may be a single compound such as water or oil, or may comprise a multiplicity of compounds some of which in themselves may possess therapeutic properties. Thus the novel esters or salts may be utilized in the form of aqueous solutions which may be isotonic, or as oil solutions or in combination with oil-soluble ointments or water-soluble jellies. Desirably the novel benzoic acid ester or salt thereof is incorporated in the extending medium in relatively minor proportion.

The following illustrate therapeutic compositions comprising the novel compounds in association with extending media.

A. Aqueous solution

|  | Percent |
|---|---|
| 3-(2'-methylpiperidino)-propyl p-cyclopentyloxybenzoate hydrochloride | 0.5 |
| Ringer's solution | 99.5 |

B. Oil solution

|  | Percent |
|---|---|
| 3-(2'-methylpiperidino)-propyl p-cyclohexyloxybenzoate hydrochloride | 1.0 |
| Cottonseed oil | 99.0 |

C. Oil-soluble ointment

|  | Percent |
|---|---|
| 3-(2'-methylpiperidino)-propyl p-cyclohexyloxybenzoate hydrochloride | 1.0 |
| Beeswax | 8.0 |
| Cholesterol | 1.0 |
| Lanolin | 15.0 |
| Stearyl alcohol | 3.0 |
| Petrolatum | 71.5 |
| Benzoin | 0.5 |

D. Water-soluble jelly

|  | Percent |
|---|---|
| 3-(2'-methylpiperidino)-propyl p-cyclohexyloxybenzoate hydrochloride | 0.5 |
| Glycerin | 15.0 |
| Gum tragacanth | 2.0 |
| Trisodium phosphate | 0.055 |
| Water | q. s. 100.0 |

Specific examples illustrating the preparation of the novel compounds of this invention are as follows:

Example 1

3-(2'-methylpiperidino) - propyl p-cyclohexyloxybenzoate hydrochloride may be prepared as follows:

7.4 g. of sodium are dissolved in 250 cc. of isoamyl alcohol, 53 g. of ethyl p-hydroxybenzoate are added and the mixture is heated to refluxing temperature for about 15 minutes. To the cooled mixture, 65 g. of cyclohexyl bromide are added and the mixture is refluxed for about 3 hours. The isoamyl alcohol is removed by evaporation in vacuo and the residue is extracted with 10 percent aqueous sodium hydroxide solution to remove the unreacted ethyl p-hydroxybenzoate. The alkali-insoluble residue comprising ethyl p-cyclohexyloxybenzoate is hydrolyzed by refluxing with 10 percent sodium hydroxide solution for about 3 hours. The alkaline reaction mixture is acidified with hydrochloric acid whereupon p-cyclohexyloxybenzoic acid precipitates. The precipitate is separated by filtration, washed with water and dried. It melts at about 178–180° C. Yield: about 7 percent.

62 g. of p-cyclohexyloxybenzoic acid and 49.5 g. of 3-(2'-methylpiperidino)-propyl chloride are dissolved in 300 cc. of dry isopropanol and the mixture refluxed for about 12 hours. About half of the isopropanol is then distilled off and the residual solution cooled to about 0° C. 3(2'-methylpiperidino) - propyl p - cyclohexyloxybenzoate hydrochloride precipitates as a white crystalline compound. It is filtered off, washed once with ether and recrystallized from isopropanol.

3(2'-methylpiperidino) - propyl p - cyclohexyloxybenzoate hydrochloride thus prepared melted at about 178–180° C. Analysis showed the presence of 8.88 percent chlorine as compared with the calculated value of 8.96 percent.

Example 2

3-(2'-methylpiperidino) - propyl p-cyclohexyloxybenzoate may be prepared as follows:

3.8 g. of 3-(2'-methylpiperidino)-propyl p-cyclohexyloxybenzoate hydrochloride are dissolved in 50 cc. of water and to the solution is added a solution of 0.4 g. of sodium hydroxide in 10 cc. of water. The oily 3-(2'-methylpiperidino)-propyl p-cyclohexyloxybenzoate which separates is taken up in ether, the ether solution separated and dried with potassium carbonate, and the ether evaporated, preferably under vacuum, leaving the 3-(2'-methylpiperidino) - propyl p-cyclohexyloxybenzoate as a residual colorless oil which may be further purified by distillation under reduced pressure.

Example 3

3-(2'-methylpiperidino) - propyl p-cyclohexyloxybenzoate hydrochloride may also be prepared in the following manner:

p-Cyclohexyloxybenzoyl chloride is prepared by treating 44 g. of p-cyclohexyloxybenzoic acid with 30 g. of thionyl chloride and refluxing the mixture for about 2 hours. The excess thionyl chloride is removed by evaporation in vacuo leaving the p-cyclohexyloxybenzoyl chloride as an oil.

To a refluxing solution of 12 g. of 3-(2'methylpiperidino)-propyl alcohol dissolved in 70 cc. of dry benzene are added 17 g. of p-cyclohexyloxybenzoyl chloride over a period of about one half hour. The solution is refluxed for a period of about two hours after the p-cyclohexyloxybenzoyl chloride addition has been completed, and is then cooled. The 3 - (2' - methylpiperidino)-propyl p - cyclohexyloxybenzoate hydrochloride which is formed during the reaction is filtered off and washed with ether. It is further purified by recrystallization from isopropanol. The 3-(2'-methylpiperidino) - propyl p - cyclohexyloxybenzoate hydrochloride melts at about 178–180° C.

Example 4

3-(2'-methylpiperidino)-propyl p-cyclopentyloxybenzoate hydrochloride may be prepared as follows:

p-Cyclopentyloxybenzoic acid is prepared in the same manner as the p-cyclohexyloxybenzoic acid described in Example 1 except that cyclopentyl bromide is used in place of cyclohexyl bromide. p-Cyclopentyloxybenzoic acid melts at about 174–176° C.

3-(2'-methylpiperidino)-propyl p-cyclopentyloxybenzoate hydrochloride may be prepared from p-cyclopentyloxybenzoic acid by the method described in Example 1 for the preparation of 3-(2'-methylpiperidino) - propyl p - cyclohexyloxybenzoate hydrochloride.

3-(2'-methylpiperidino)-propyl p-cyclopentyloxybenzoate hydrochloride thus prepared melted at 175–178° C. Analysis showed the presence of 9.38 percent chlorine as compared with the calculated value of 9.28 percent.

Example 5

3-(2'-methylpiperidino)-propyl p-cyclopentyloxybenzoate may be prepared from the corresponding hydrochloric acid salt by the method described in Example 2 for the preparation of 3-(2'-methylpiperidino)-propyl p-cyclohexyloxybenzoate. 3-(2'-methylpiperidino)-propyl p-cyclopentyloxybenzoate is a colorless oil which may be distilled under reduced pressure.

Example 6

3-(2'-methylpiperidino)-propyl p-cyclopentyloxybenzoate hydrochloride may also be prepared from p-cyclopentyloxybenzoic acid by the method described in Example 3 for the preparation of 3-(2'-methylpiperidino)-propyl p-cyclohexyloxybenzoate hydrochloride.

3-(2'-methylpiperidino)-propyl p-cyclopentyloxybenzoate hydrochloride thus prepared melts at about 175–178° C.

It may be noted that the compounds of this invention also may be prepared by processes of trans-esterification, condensation and replacement.

We claim:

1. Novel compounds represented by the formula

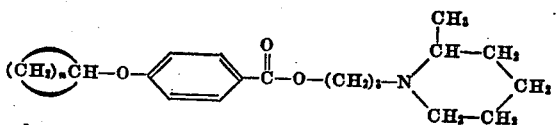

where $n$ is one of the integers 4 and 5; and acid addition salts thereof.

2. 3-(2'-methylpiperidino)-propyl p-cyclohexyloxybenzoate represented by the following formula

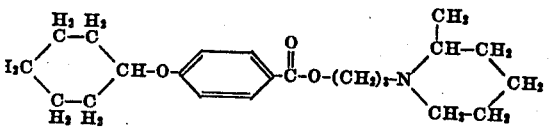

and its acid addition salts.

3. 3-(2'-methylpiperidino)-propyl p-cyclohexyloxybenzoate hydrochloride represented by the formula

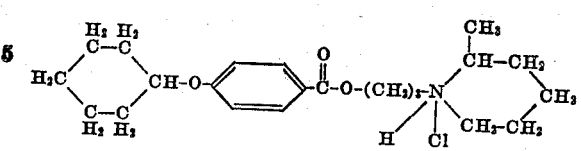

4. 3-(2'-methylpiperidino)-propyl p-cyclopentyloxybenzoate represented by the formula

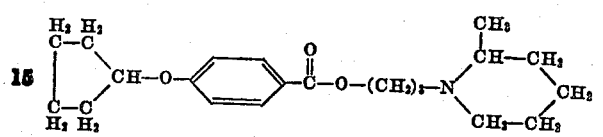

and its acid addition salts.

5. Therapeutic compositions comprising a member of the class consisting of compounds represented by the formula

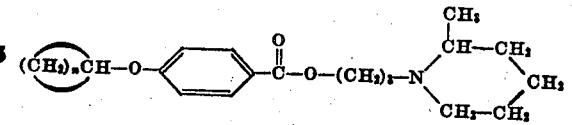

wherein $n$ is one of the integers 4 and 5, and acid addition salts thereof; in association with an extending medium.

SAMUEL M. McELVAIN.
THOMAS P. CARNEY.